(12) United States Patent
Harada et al.

(10) Patent No.: US 8,097,366 B2
(45) Date of Patent: Jan. 17, 2012

(54) ALKALINE BATTERY SEPARATOR COMPRISING ALKALI-RESISTANCE SYNTHETIC FIBER, FIBRILLATED ORGANIC SOLVENT-SPUN CELLULOSE FIBER AND MERCERIZED PULP, AND ALKALINE PRIMARY BATTERY

(75) Inventors: Toshimitsu Harada, Okayama (JP); Hisashi Nagi, Okayama (JP); Hiroyuki Kawai, Osaka (JP); Masakazu Nishiyama, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 1007 days.

(21) Appl. No.: 11/816,714

(22) PCT Filed: Feb. 23, 2006

(86) PCT No.: PCT/JP2006/303304
§ 371 (c)(1),
(2), (4) Date: Aug. 21, 2007

(87) PCT Pub. No.: WO2006/090790
PCT Pub. Date: Aug. 31, 2006

(65) Prior Publication Data
US 2009/0017385 A1    Jan. 15, 2009

(30) Foreign Application Priority Data

Feb. 25, 2005 (JP) ................... 2005-050498

(51) Int. Cl.
*H01M 2/16* (2006.01)
(52) U.S. Cl. .................. 429/255; 429/247; 429/249

(58) Field of Classification Search .................. None
See application file for complete search history.

(56) References Cited

U.S. PATENT DOCUMENTS 5,366,832 A * 11/1994 Hayashi et al. ............... 429/249
2006/0121340 A1   6/2006 Kawai et al.

FOREIGN PATENT DOCUMENTS

| EP | 1 542 295 A1 | 6/2005 |
|---|---|---|
| GB | 2 317 264 A | 3/1998 |
| JP | 62 154559 | 7/1987 |
| JP | 1 146249 | 6/1989 |
| JP | 6 163024 | 6/1994 |
| JP | 6 231746 | 8/1994 |
| JP | 10 92411 | 4/1998 |
| JP | 11 233093 | 8/1999 |
| JP | 2000 315488 | 11/2000 |
| JP | 2000 331665 | 11/2000 |
| JP | 2000 348702 | 12/2000 |
| JP | 2006 4732 | 1/2006 |
| WO | WO 2004/025756 A1 | 3/2004 |

OTHER PUBLICATIONS

U.S. Appl. No. 11/570,135, filed Dec. 7, 2006, Harada et al.

* cited by examiner

*Primary Examiner* — Ula C Ruddock
*Assistant Examiner* — Tony Chuo
(74) *Attorney, Agent, or Firm* — Oblon, Spivak, McClelland, Maier & Neustadt, L.L.P.

(57) ABSTRACT

An alkaline battery separator including 25 to 62% by mass of an alkali-resistance synthetic fiber, 5 to 25% by mass of a fibrillated organic solvent-spun cellulose fiber having a Canadian standard freeness value of 10 to 280 ml, and 33 to 50% by mass of a mercerized pulp having a Canadian standard freeness value of not less than 550 ml, wherein the fibrillated organic solvent-spun cellulose fiber intertwines with the mercerized pulp.

6 Claims, No Drawings

ALKALINE BATTERY SEPARATOR COMPRISING ALKALI-RESISTANCE SYNTHETIC FIBER, FIBRILLATED ORGANIC SOLVENT-SPUN CELLULOSE FIBER AND MERCERIZED PULP, AND ALKALINE PRIMARY BATTERY

TECHNICAL FIELD

The present invention relates to a battery separator preferable for an alkaline battery such as an alkaline manganese battery, a mercury battery, a silver oxide battery or a zinc air battery and an alkaline battery equipped with the battery separator. More specifically, this invention relates to an alkaline battery separator having the durability that prevents the shrinkage caused by an electrolyte such as an aqueous solution of potassium hydroxide (KOH) or by an electrode agent such as manganese dioxide and the enhanced performances such as the sufficient retention of an electrolyte for generating electrogenic reactions and decrease in inner electrical resistance without preventing ion conduction and an alkaline primary battery equipped with the separator.

BACKGROUND ART

In general, separators are used for separating positive and negative electrode active materials in alkaline primary batteries. The separators require a variety of performances such as the followings:
1. preventing the internal short circuit caused by contact between the positive and negative electrode active materials,
2. retaining high electrolyte-absorbing property to generate sufficient electrogenic reactions,
3. taking the less occupancy when the separator is built into the battery to increase the amounts of positive and negative electrode active materials (for prolonging the usable time of the battery), and
4. having the durability that prevents shrinkage caused by an electrolyte such as a potassium hydroxide (KOH) solution or by an electrode agent such as manganese dioxide.

As the battery separator having the above-mentioned performances, the battery separator comprising a polyvinyl alcohol-series fiber has proposed, in view of excellent chemical resistance, hydrophilicity, and mechanical performance of the fiber. The separator comprising a polyvinyl alcohol-series fiber in combination with a cellulose-series fiber has been also proposed, in view of enhancing additionally the electrolyte-absorbing property.

For example, Japanese Patent Application Laid-Open No. 146249/1989 (JP-1-146249A, Patent Document 1) discloses a separator paper for an alkaline dry battery that comprises a synthetic fiber mainly comprising an unacetalized polyvinyl alcohol-series synthetic fiber having a finesses of not more than 0.5 denier and an acetalized polyvinyl alcohol-series synthetic fiber having a fineness of not more than 0.5 denier, and the mass ratio of both fibers is 90:10 to 10:90. This document describes that 5 to 70% by mass of a cellulose-series pulp such as a mercerized cotton linter pulp is further contained relative to the total amount of the fiber and the pulp.

Japanese Patent Application Laid-Open No. 154559/1987 (JP-62-154559A, Patent Document 2) discloses an alkaline dry battery equipped with a separator paper partially or totally comprising a synthetic fiber such as a polyvinyl alcohol-series fiber having a fineness of not more than 0.8 denier. This document describes that the separator paper further comprises a cellulose-series fiber such as a rayon fiber, an acetate fiber, a cotton linter pulp, a wood pulp or an acrylic acid pulp fiber in a proportion of 15 to 85% by mass.

Although these battery separators comprise alkali-resistance cellulose materials in a high compounding proportion to enhance the electrolyte retention capability, these separators are not practical from the viewpoint of the required standards for a separator in recent years because of the change in dimension (the shrinkage in area) caused by a strong alkaline electrolyte. For example, according to the patent document 2, the separator having the denseness and the high electrolyte retention capability is obtainable. However, because the shrinkage by the area of the separator becomes not less than 5% (after immersing in 40% KOH aqueous solution, at 80° C. for 24 hours), alkali resistance of the separator declines. Moreover, the sealing part of the separator opens on impact caused by shaking or by dropping when conveying or carting the battery, and the negative electrode gel leaks out therefrom. As a result, the internal short circuit is caused.

On the contrary, Japanese Patent Application Laid-Open No. 231746/1994 (JP-6-231746A, Patent Document 3) discloses a separator paper for an alkaline battery that has alkali resistance and comprises an organic solvent-spun rayon fiber having a Canadian standard freeness value of 0 to 500 ml, in a proportion of 20 to 90% by mass. This document describes that as an alkali-resistance synthetic fiber such as a vinylon fiber or a regenerated cellulose fiber or the like is mixed. Moreover, the document describes that as one part of the organic solvent-spun rayon fiber, a linter pulp and/or a mercerized kraft pulp may be contained in a proportion of not more than 30% by mass.

Japanese Patent Application Laid-Open No. 163024/1994 (JP-6-163024A, Patent Document 4) discloses an alkaline battery separator containing as at least part of the main fibers a fibrillated product of cellulose fiber obtained by dissolving a cellulose in a solvent and depositing the cellulose directly. This document describes that the separator comprises a polyvinyl alcohol-series fiber having a fineness of not more than 1 denier in a proportion of not less than 5% by mass relative to the main fiber.

Although these separators has excellent alkali resistance, denseness, high electrolyte retention capability, and excellent electric property, the separators themselves are lacking in so-called stiffness. The separators themselves bend on impact caused by shaking or by dropping when conveying or carting the battery, and the negative electrode gel leaks. As a result, the internal short circuit is caused.

[Patent Document 1] JP-1-146249A (Claims, page 3, lower right column, line 4 to page 4, upper left column, line 11, and Example 3)
[Patent Document 2] JP-62-154559A (Claims, page 3, lower left column, lines 12 to 17, and Examples)
[Patent Document 3] JP-6-231746A (Claims, and Example 5)
[Patent Document 4] JP-6-163024A (Claims)

DISCLOSURE OF THE INVENTION

Problems to be Solved by the Invention

It is therefore an object of the present invention to provide an alkaline battery separator being excellent in denseness, electrolyte retention capability, and alkali resistance and having great stiffness strength (drop impact resistance) and to provide an alkaline battery equipped with the separator.

Means to Solve the Problems

The inventors of the present invention made intensive studies to achieve the above objects and finally found that an alkaline battery separator comprising an alkali-resistance synthetic fiber, a fibrillated organic solvent-spun cellulose fiber having a specific degree of beating, and a mercerized pulp having a specific degree of beating in a predetermined proportion is excellent in denseness, electrolyte retention capability, and alkali resistance in an electrolyte. In addition, the separator itself has stiffness strength (drop impact resistance) preventing the internal short circuit that occurs on impact caused by shaking or by dropping when conveying or carting the battery. The present invention has been accomplished based on the above findings.

That is, the alkaline battery separator of the present invention is a separator comprising an alkali-resistance synthetic fiber, a fibrillated organic solvent-spun cellulose fiber having a CSF (Canadian standard freeness) value of 10 to 280 ml, and a mercerized pulp having a CSF value of not less than 550 ml, and the proportion of the alkali-resistance synthetic fiber, the proportion of the fibrillated organic solvent-spun cellulose fiber, and the proportion of the mercerized pulp relative to the total amount of the separator are respectively 25 to 62% by mass, 5 to 25% by mass, and 33 to 50% by mass. The alkali-resistance synthetic fiber may comprise a polyvinyl alcohol-series fiber having an average fiber fineness of not more than 1 dtex. The mercerized pulp may comprise a mercerized product of a hardwood pulp, a softwood pulp, a eucalyptus pulp, a Manila hemp pulp, a sisal hemp pulp or a cotton linter pulp. The alkaline battery separator of the present invention may further comprise a polyvinyl alcohol-series binder in a proportion of 3 to 20% by mass relative to the total amount of the separator. The alkaline battery separator of the present invention usually comprises a wet-laid nonwoven fabric. The alkaline battery separator of the present invention may have a shrinkage by the area of not more than 3.5% after immersing in an aqueous solution of potassium hydroxide having a concentration of 40% by mass at 80° C. for 24 hours and a stiffness strength of not less than 2 N.

The present invention also includes an alkaline primary battery equipped with the separator for alkaline battery.

Effects of the Invention

According to the present invention, because a separator comprises a combination of an alkali-resistance synthetic fiber, a fibrillated organic solvent-spun-cellulose fiber having a specific degree of beating, and a mercerized pulp having a specific degree of beating in a predetermined proportion, the separator has excellent properties required for an alkaline battery separator such as denseness, electrolyte retention capability, and alkali resistance in an electrolyte. The separator itself also has the great stiffness strength. In particular, an organic solvent-spun cellulose fiber that is very finely fibrillated intertwines with a mercerized pulp to inhibit the shrinkage in an area and the swelling of the separator in an electrolyte and to improve the denseness of the separator. As a result, the separator can prevent the internal short circuit caused by the contact of the active materials of positive and negative electrodes and the increase in internal resistance with non-mercuration. Moreover, a mercerized pulp and an organic solvent-spun cellulose fiber that is very finely fibrillated are mixed in a specific proportion to intertwine with each other. As a result, the stiffness strength of the separator is enhanced and the separator can prevent the internal short circuit that occurs on impact caused by shaking or by dropping when conveying or carting the battery. Specifically, the alkaline battery separator having a shrinkage by the area of not more than 3.5% as an alkali resistance index, an air permeability of not more than 10 ml/cm$^2$/sec as a denseness index, an elec- trolyte retention capability of not less than 5.5 g/g, and a stiffness strength of not less than 2 N can be prepared.

DESCRIPTION OF THE PREFERRED EMBODIMENT

[Alkaline Battery Separator]

The alkaline battery separator of the present invention comprises an alkali-resistance synthetic fiber as a main fiber, a fibrillated organic solvent-spun cellulose fiber, and a mercerized pulp. The separator may further comprise a binder.

(Alkali-Resistance Synthetic Fiber)

The alkali-resistance synthetic fiber may include, for example, a vinyl-series fiber (for example, a polyvinyl alcohol-series fiber, an ethylene-vinyl alcohol-series copolymer fiber, and a polyvinyl acetal-series fiber), a polyolefinic fiber (for example, a polypropylene-series fiber, a polyethylene-series fiber, a polypropylene-polyethylene conjugated fiber, and a polymethylpentene fiber), an acrylic fiber (for example, an acrylonitrile fiber having an acrylonitrile unit, such as a polyacrylonitrile fiber), a polyamide-series fiber (for example, an aliphatic polyamide-series fiber such as a polyamide 6 or a polyamide 66, an alicyclic polyamide-series fiber, an aromatic polyamide-series fiber, and a conjugated fiber comprising such a polyamide and a modified polyamide), a polyparaphenylenebenzobisoxazole fiber, a polyphenylene sulfide fiber, and a cellulose-series fiber (for example, an artificial silk (or rayon) fiber, and an acetate fiber). These fibers may be used singly or in combination. Among these fibers, in the light of the excellent affinity (wettability) for an electrolyte, a vinyl-series resin such as a polyvinyl alcohol-series fiber, an ethylene-vinyl alcohol-series copolymer fiber or a polyvinyl acetal-series fiber, in particular, a polyvinyl alcohol-series fiber is preferred.

In the present invention, in particular, as a main fiber a polyvinyl alcohol-series fiber having a dissolution temperature in water of not lower than 90° C., specifically not lower than 100° C. is preferably used. A polyvinyl alcohol-series fiber having such a dissolution temperature in water is obtainable by regulating the degree of polymerization, the degree of saponification, and a proportion of a copolymerizable component of a polyvinyl alcohol-series polymer or by acetalizing a polyvinyl alcohol-series polymer. The dissolution temperature in water in the present invention is determined by the following procedures. A sample fiber of 2.6 g is put in water of 400 ml (20° C.), and heated with agitating on the condition; a rate of temperature increase of 1° C./min and a rate of agitation speed of 280 rpm. The temperature at which the fiber has completely dissolved is measured and determined as a dissolution temperature in water.

Specifically, the average degree of polymerization of the polyvinyl alcohol-series polymer is, for example, about 1000 to 5000, preferably about 1200 to 4500, and more preferably about 1500 to 4000.

The degree of saponification is, for example, not less than 95 mol %, preferably about 98 to 99.99 mol %, and more preferably about 99 to 99.95 mol %.

The polyvinyl alcohol-series polymer may be copolymerized with the other copolymerizable component(s). From the viewpoints of water resistance and others, the proportion of the copolymerizable component relative to the total amount of the resin is, for example, not more than 20 mol %, preferably about 0.01 to 10 mol %, and more preferably about 0.1 to 5 mol %.

The polyvinyl alcohol-series polymer is preferably acetalized with an aldehyde such as formaldehyde or butylaldehyde. The degree of acetalization is about 10 to 45 mol %, and preferably about 20 to 40 mol % in the total hydroxyl groups.

The alkali-resistance synthetic fiber may comprise one kind of polymer (for example, a polyvinyl alcohol-series polymer alone) or a plurality of polymers (for example, a polyvinyl alcohol-series polymer and other polymer(s)). For example, the alkali-resistance synthetic fiber may be a conjugated spun fiber or a mixed spun fiber comprising the polyvinyl alcohol-series polymer and other polymer(s). Such a fiber may have, for example, a structure of a cross-sectional structure such as a sheath-core form (for example, in the form the core is formed by other polymer(s)), an islands-in-the-sea-shaped form, a side-by-side form (a multilayer type), an orange cross-sectional form or a fan-shaped form (in the form layers of polymers are alternately arrayed in a radial pattern). As for the polyvinyl alcohol-series fiber, from the viewpoints of the electrolyte-absorbing property, the mechanical property and others, the proportion of the polyvinyl alcohol-series polymer in the fiber is about not less than 30% by mass (about 30 to 100% by mass), preferably about not less than 50% by mass (for example, about 50 to 100% by mass), and more preferably about not less than 80% by mass (for example, about 80 to 100% by mass).

From the viewpoints of the feasibility of thinning a separator with an enhanced separability, paper-productivity, and inhibiting an increase in inner pressure, the average fiber fineness of the alkali-resistance synthetic fiber is not more than about 1.1 dtex (for example, about 0.01 to 1.1 dtex), preferably about 0.03 to 1 dtex (for example, about 0.05 to 0.9 dtex), and more preferably about 0.07 to 0.7 dtex (particularly about 0.1 to 0.6 dtex).

The average fiber length of the alkali-resistance synthetic fiber may be suitably selected according to the average fiber fineness. From the viewpoints of paper-productivity and others, the average fiber finesse is, for example, about 0.5 to 10 mm, and more preferably about 1 to 5 mm.

The shape of the alkali-resistance synthetic fiber (the shape of the whole fiber) in a direction perpendicular to the fiber length may include a circular cross section or a modified cross section (for example, an elliptical cross section, a polygonal cross section such as a triangle to an octagonal, a T-shaped cross section, a Y-shaped cross section, and a C-shaped cross section).

From the viewpoints of alkali resistance, the proportion of the alkali-resistance synthetic fiber relative to the total amount of separator is, for example, about 25 to 62% by mass, preferably about 28 to 60% by mass, and more preferably about 30 to 55% by mass (particularly about 35 to 50% by mass).

(Fibrillated Organic Solvent-Spun Cellulose Fiber)

In the present invention, the organic solvent-spun cellulose fiber (solvent-spun cellulose fiber) differs from a so-called regenerated cellulose fiber (a fiber such as a viscose rayon or a cuprammonium rayon that is obtained by chemically transforming a cellulose into a cellulose derivative, and then returning the derivative into a cellulose) and means a fiber (a purified cellulose fiber) that is obtained by dissolving a cellulose in a solvent without any chemical changes, and then precipitating the cellulose simply from the solvent.

The specific examples of the organic solvent-spun cellulose fiber include, an organic solvent-spun cellulose fiber obtained by preparing a dope in which a cellulose is dissolved in an amine oxide (for example, N-methylmorpholine N-oxide), dry-jet and wet spinning the dope in water to precipitate a cellulose fiber, and drawing the cellulose fiber. A lyocell is included in a typical example of these fibers and has been marketed from Lenzing Inc. in Austria under the tradename of "Tencel" (a registered trademark).

In the present invention, the method for manufacturing the fibrillated organic solvent-spun cellulose fiber (solvent-spun cellulose fibril) is not particularly limited to a specific one as long as the fibrillated fiber is a fibrillated organic solvent-spun cellulose fiber. The fibrillated product is usually obtained by beating an organic solvent-spun cellulose fiber immersed in water by a beating engine such as a beater (e.g., Niagara beater), a Jordan engine, a pulper, a refiner, (e.g., a conical refiner, a clafrin refiner, a single disc refiner, and a double disc refiner) or a high-speed disintegrator.

The beaten solvent-spun cellulose fibril has a degree of beating (a degree of swelling and a fineness)) that may be selected from a range of CSF (Canadian standard freeness) values of 10 to 280 ml, and may be, for example, about 20 to 250 ml, preferably about 30 to 200 ml, and more preferably about 50 to 150 ml. A beaten organic solvent-spun cellulose fiber having an exceedingly low degree of beating tends to impair the texture of the separator itself, and it becomes difficult to obtain the denseness and the homogeneity of the separator. On the contrary, a beaten organic solvent-spun cellulose fiber having an exceedingly high degree of beating tends to be lacking in an amount of the extra fine fibril fiber that inhibits the shrinkage and the swelling of a mercerized pulp in an electrolyte, and the shrinkage by the area of the separator tends to increase after immersing in 40% KOH aqueous solution at 80° C. for 24 hours.

The average fiber fineness of the solvent-spun cellulose fiber (before beating) is, for example, about 0.01 to 10 dtex, preferably about 0.1 to 5 dtex, and more preferably about 0.5 to 4 dtex (particularly, about 1 to 3 dtex). The average length of the fiber (before beating) is, for example, about 0.5 to 10 mm, and preferably about 1 to 5 mm.

Because the fibrils obtained by beating of the organic solvent-spun cellulose fibers develop extremely well up to the innermost layer part of the fiber, the fibrils become not only an extra fine fiber by beating the fiber completely, but also a long external fibril and intertwines intricately with the mercerized pulp to form a dense structure. The dense structure allows the separator to prevent the shrinkage and the swelling in an electrolyte and retain tightly the solution in the voids between the long fibrils. As a result, the electrolyte retention capability and the separatability of the separator are enhanced.

From the viewpoint of the drop impact resistance) of the separator, the proportion of the solvent-spun cellulose fibril relative to the total amount of the separator is, for example, about 5 to 25% by mass, preferably about 6 to 20% by mass, and more preferably about 7 to 18% by mass (particularly about 8 to 15% by mass).

In particular, in the present invention, the drop impact resistance can be enhanced by using the alkali-resistance synthetic fiber as a main fiber and reducing a proportion of the solvent-spun cellulose fibril relative to the alkali-resistance synthetic fiber, while maintaining a variety of the properties required for a separator such as alkali resistance and others. As for the proportion of both components, the proportion of the solvent-spun cellulose fibril relative to 100 parts by mass of the alkali-resistance synthetic fiber is, for example, about 1 to 100 parts by mass, preferably about 5 to 70 parts by mass, and more preferably about 10 to 50 parts by mass.

(Mercerized Pulp)

The pulp used for a mercerized pulp may include, for example, a wood pulp (e.g., a hardwood pulp, a softwood pulp, and a eucalyptus pulp), a hemp pulp (e.g., a Manila hemp pulp and a sisal hemp pulp), and a cotton pulp (e.g., a cotton linter pulp). These pulps may be used singly or in combination. Among these pulps, it is preferred to use a pulp having a large fiber length, for example, a hardwood pulp such as a Laubholz Bleached Kraft Pulp (LBKP) and a softwood pulp such as a Nadelholz Bleached Kraft Pulp (NBKP).

Such a pulp is mercerized by a conventional method. Generally, the pulp is mercerized with an alkali such as sodium hydroxide or ammonia. The mercerization enables the inside of a fiber in the pulp to swell, and the softness of the pulp can be enhanced. The mercerization may be conducted with sodium hydroxide or others. From the viewpoints of the high uniformity of swelling, the form stability, and the tearing strength of the separator, among mercerizations a mercerization with ammonia is preferred.

In the present invention, the mercerized pulp may be also beaten by a beating engine. When the mercerized pulp is beaten, the degree of beating of the mercerized pulp in CSF value is, for example, not less than 550 ml, preferably not less than 580 ml, and more preferably 580 to 700 ml. Since in beaten mercerized pulp having an exceedingly small CFS value, the pulp becomes short during beating, and cannot prevent the separator itself from keeping stiffness strength, tends to decline the drop impact resistance of the separator. On the contrary, because in a beaten mercerized pulp having an exceedingly high degree of beating, the pulp becomes powders, and the powder having a small aspect ratio serves as a filler that increases an internal resistance considerably, it is feared that the battery performance declines. Consequently, in the present invention, a beaten pulp having a CFS value in the aforementioned range or a non-beaten pulp having a CFS value of not less than 700 ml is preferred.

From the viewpoint of the alkali resistance of the separator, the proportion of the mercerized pulp relative to the total amount of the separator is, for example, about 33 to 50% by mass, preferably about 34 to 48% by mass, and more preferably about 35 to 45% by mass (particularly about 35 to 40% by mass). An exceedingly small proportion of the mercerized pulp tends to deteriorate the drop impact resistance of the separator. On the contrary, an exceedingly large proportion of the pulp increases the shrinkage by the area and the degree of swelling of the separator in an electrolyte. As a result, in the both cases, the practicability of the separator tends to decline.

The proportion of the mercerized pulp relative to 100 parts by mass of the alkali-resistance synthetic fiber is, for example, about 30 to 200 parts by mass, preferably about 50 to 150 parts by mass, and more preferably about 60 to 120 parts by mass.

The content of the solvent-spun cellulose fibril and the mercerized pulp and the degree of beating of the cellulose component (cellulose fiber) may be suitably selected from the above-mentioned ranges according to the properties required for the battery separator. In the present invention, the amount of the cellulose fiber (the total amount of the solvent-spun cellulose fibril and the mercerized pulp) relative to the total amount of the separator may be, for example, about 38 to 65% by mass, and preferably about 40 to 60% by mass. An exceedingly small amount of the cellulose tends to decrease the amount of electrolyte retention of the separator. On the contrary, an exceedingly large amount of the cellulose causes not only a decrease in the stiffness strength of the separator itself, but also an increase in the shrinkage in an electrolyte in spite of imparting the sufficient electrolyte retention capability to the separator. As a result, the practicability of the separator tends to decline.

From the viewpoints of enhancing both the drop impact resistance and the electrolyte retention capability and inhibiting the shrinkage of the separator in an electrolyte, the proportion of the solvent-spun cellulose fibril relative to 100 parts by mass of the mercerized pulp is, for example, about 1 to 200 parts by mass, preferably about 3 to 100 parts by mass, and more preferably about 5 to 70 parts by mass (particularly about 10 to 50 parts by mass). In the case where the proportion of the solvent-spun cellulose fibril relative to the mercerized pulp is in the range, the fibril and the pulp intertwine with each other tightly enough to inhibit the shrinkage in area or the swelling of the separator in an electrolyte and to improve the denseness of the separator. In other words, an exceedingly small proportion of the solvent-spun cellulose fibril causes difficulties in inhibiting the shrinkage in area or the swelling of the mercerized pulp in an electrolyte. Further, since the stiffness strength of the separator in the electrolyte declines, the separator cannot keep the drop impact resistance. On the contrary, an exceedingly large proportion of the solvent-spun cellulose fibril does not affect the shrinkage by area, a degree of swelling, and the electrolyte retention capability of the mercerized pulp. As a result, a use of exceedingly large proportion of the fibril is uneconomic because the cellulose constituting the fibril is expensive.

(Binder)

In the present invention, the binder may be used with the main fiber and the cellulose component. The form of the binder may include a fiber form, a powder form or a solution form. The fiber form is preferable for a wet-laid paper producing of the separator. In the case of using a binder in a fiber form (a binder fiber), the binder is not completely dissolved to keep the form by means such as lowering the contained moisture content before drying so that the binder and the main fiber can be spot-glued together exclusively onto the intersecting points thereof. As a result, the strength (or stiffness strength) of the separator can be enhanced without causing a decrease in the electrolyte-absorbing property or an increase in the internal resistance of the battery.

The binder fiber is not particularly limited to a specific one as long as the binder comprises an adhesive resin. The binder fiber may include a binder fiber comprising an adhesive resin, for example, a polyolefinic resin, an acrylic resin, a styrene-series resin, a vinyl acetate-series polymer, a polyvinyl alcohol-series polymer, an ethylene-vinyl alcohol-series copolymer or a polyamide-series resin. These binder fibers may be used singly or in combination. From the viewpoints of the durability in an electrolyte and the liquid-absorbing property of the solution of the binder fiber, among the binder fibers, the binder fiber comprising a polyvinyl alcohol-series polymer is preferred.

The polyvinyl alcohol-series polymer constituting the binder fiber, preferably has a lower dissolving temperature in water than the temperature of the main fiber. For example, the dissolving temperature in water of the polyvinyl alcohol-series polymer is preferably about 60 to 90° C., and specifically about 70 to 90° C.

The polyvinyl alcohol-series polymer having such a dissolving temperature in water may have an average degree of polymerization of, for example, about 500 to 3000, preferably about 600 to 2500, and more preferably about 700 to 2000. The degree of saponification of the polymer is, for example, about 95 to 99.9 mol %, preferably about 96 to 99.5 mol %, and more preferably about 97 to 99 mol %. The kinds and the proportion of the copolymerizable component in the polyvinyl alcohol-series are the same as those in the polyvinyl alcohol-series polymer as the main fiber.

In addition, the binder may comprise one kind of polymer (for example, a polyvinyl alcohol-series polymer alone) or a plurality of polymers (for example, a polyvinyl alcohol-series polymer and other polymer(s)). The conjugated structure of the binder and the proportion of the other polymers are the same as in the alkali-resistance synthetic fiber.

From the viewpoints of the water dispersibility of the binder and the adhesiveness thereof to other components, and the productivity of a nonwoven fabric having a uniform pore size, the average fiber fineness of the binder fiber is, for example, about 0.01 to 3 dtex, preferably about 0.1 to 2.7 dtex, and more preferably about 0.5 to 2.5 dtex (particularly 1 to 2 dtex). The average fiber length of the binder fiber is, for example, about 0.5 to 10 mm, and preferably about 1 to 5 mm.

The proportion of the binder relative to the total amount of the separator may be, for example, not more than 30% by mass (for example, 1 to 30% by mass), and is preferably about 3 to 20% by mass, and more preferably about 5 to 18% by mass. An exceedingly small proportion of the binder may sometimes cause a decrease in the stiffness strength of the separator. On the contrary, since an exceedingly large proportion of the binder may fill up the void between the fibers and deteriorates the liquid-absorbing property of the separator, there is a fear of increasing the electric resistance.

(Properties of Alkaline Battery Separator)

The alkaline battery separator of the present invention comprises a fiber assembly comprising the main fiber that serves as the main structure of the separator and the cellulose component. From the viewpoints of the properties or the productivity of the separator, a wet-laid nonwoven fabric is preferred as the fiber assembly.

When comprising a nonwoven fabric, the separator of the present invention is obtainable, for example, by beating the solvent-spun cellulose fiber by the beating machine to fibrillate, then mixing the obtained fibril, the alkali-resistance synthetic fiber, and the mercerized pulp, and forming the mixture as a raw material into a sheet of a nonwoven fabric by a conventional dry or a conventional wet process.

In particular, in the case of a wet-laid nonwoven fabric, a desired wet-laid nonwoven fabric may be efficiently produced by, for example, a common wet-laid paper machine. The paper machine may include, for example, a paper machine having a wire part such as a cylinder, a short wire or a long wire (or fourdrinier). In the paper production process, these wire parts may be used singly for a single-layer paper or in combination with being piled up for a multi-layer paper. From the viewpoint of obtaining a paper (nonwoven fabric) having the homogeneity without unevenness of texture and the excellent electric property, a paper producing with a multi-layered wire part is preferred; in particular, a paper producing with a two-layered wire part is preferably conducted by a short wire-cylinder paper machine. Specifically, the main fiber and the cellulose component (if necessary, the binder, and others) are dispersed in water with slow agitation to prepare a homogeneous slurry for paper producing, and the slurry is subjected to paper production by the paper machine. Incidentally, in paper producing, a gum, a dispersing agent or the like may be further added to the slurry. The alkaline battery separator is obtainable by drying the produced paper, with use of a dryer (e.g., a Yankee dryer) or other means, for example, at a temperature of about 100 to 180° C., and preferably about 110 to 130° C. According to need, the obtained separator may be further subjected to a heat press process or others. Moreover, a hydrophilic treatment (for example, a surfactant treatment and a corona discharge treatment) can enhance the electrolyte-absorbing property of the separator.

The form of the separator is usually a sheet form. The thickness of the sheet may be suitably selected according to the kinds of batteries, and is, for example, about 0.01 to 1 mm, preferably about 0.03 to 0.5 mm, and more preferably about 0.05 to 0.3 mm (particularly about 0.1 to 0.2 mm).

The grammage (or basis weight) of the separator may be, for example, about 10 to 100 $g/m^2$, preferably about 20 to 80 $g/m^2$, and more preferably about 25 to 50 $g/m^2$ (particularly about 30 to 40 $g/m^2$).

The alkaline battery separator of the present invention has less dimensional shrinkage in a strong alkaline electrolyte because of the excellent alkali resistance. Specifically, as an alkali resistance index of the separator, the shrinkage by the area is not more than 5%, preferably not more than 3.5% (for example, about 0.1 to 3.5%), and more preferably about 0.5 to 3% after immersing in an aqueous solution of potassium hydroxide (KOH) having a concentration of 40% by mass at 80° C. for 24 hours.

The alkaline battery separator of the present invention has also denseness. The denseness depends on a degree of beating and a compounding ratio of the main fiber and celluloses component and usually is represented by an air permeability. The air permeability may be, for example, not more than 15 $ml/(cm^2 \cdot sec)$ [for example, 1 to 15 $ml/(cm^2 \cdot sec)$], preferably not more than 12 $ml/(cm^2 \cdot sec)$ [for example, 3 to 12 $ml/(cm^2 \cdot sec)$], and more preferably not more than 10 $ml/(cm^2 \cdot sec)$[for example, 5 to 10 $ml/(cm^2 \cdot sec)$]. The separator with an exceedingly large air permeability has lower denseness, and there is a possibility that internal short circuit is caused.

In addition, the alkaline battery separator of the present invention has the excellent drop impact resistance that greatly prevents the internal short circuit caused by bending the separator itself on impact caused by shaking or by dropping when conveying or carting the battery. In the present invention, the criterion of such a drop impact resistance can be represented by the stiffness strength. The stiffness strength of the separator may be not less than 1.8 N (for example, about 1.8 to 10 N), and is preferably not less than 1.9 N (for example, about 1.9 to 5 N), and more preferably not less than 2 N (for example, about 2 to 4 N).

The tensile strength of the alkaline battery separator of the present invention may be, for example, not less than 1.5 kN/m, and is preferably about 1.7 to 10 kN/m, and more preferably about 1.8 to 5 kN/m (particularly about 2 to 3 kN/m).

INDUSTRIAL APPLICABILITY

As described above, the alkaline battery separator of the present invention has the excellent separator properties and the great stiffness strength (drop impact resistance). Accordingly, the separator is preferable as a separator for an alkaline primary battery that uses an alkaline electrolyte and needs to retain the amount of the electrode agent such as manganese dioxide (such as an alkaline manganese battery, a mercury battery, a silver oxide battery, and a zinc air battery).

EXAMPLES

Hereinafter, the following examples are intended to describe this invention in further detail and should by no means be interpreted as defining the scope of the invention. In examples, all parts and percentages are by mass unless otherwise indicated. Each properties and performances of the alkaline battery separator were determined by the following measuring methods.

[Dissolution Temperature in Water (° C.)]

A sample fiber of 2.6 g was put in water of 400 ml (20° C.) and heated with agitating on the condition; a rate of temperature increase of 1° C./min and a rate of agitation speed of 280 rpm. The temperature at which the fiber had completely dissolved was measured and determined as a dissolution temperature in water.

[Degree of Beating (Freeness): CSF (ml)]

According to JIS (Japanese Industrial Standards) P 8121 "the test method of the freeness of pulp", Canadian standard freeness of the mercerized pulp and the solvent-spun cellulose fiber used for the separator producing were determined.

[Thickness (mm), Density (g/cm$^3$)]

According to JIS P 8118 "Paper and board-determination of thickness and density", the thickness and the density of the separator were determined.

[Grammage (g/m$^2$)]

According to JIS P 8124 "Paper and board-determination of grammage (Testing methods for paper weight in gsm)", the grammage of the separator was determined.

[Tensile Strength (kN/m)]

According to JIS P 8113 "Paper and board-Determination of tensile properties-Part 2: constant rate of elongation method", the tensile strength of the separator was determined.

[Quantity of the Absorbed Electrolyte (g/g)]

A sample (separator) of 50 mm×50 mm was immersed in 40% KOH aqueous solution (23° C.) at a bath ratio of 1/100 (volume ratio) for 30 minutes and then allowed to drain for 30 seconds spontaneously. The sample was weighed. The mass of the solution retained in the sample was divided by the mass of the sample before immersing to determine a quantity of the absorbed solution.

[Liquid-Absorbing Rate (sec/25 mm)]

A sample (a height of 150 mm and a width of 25 mm) was immersed in 40% KOH aqueous solution (23° C.), and the time that the solution required to reach the height of 25 mm from the bottom of the sample was determined.

[Air Permeability (ml/(cm$^2$·sec))]

According to JIS L 1096 6.27 "Testing methods for woven fabrics air permeability", the air permeability of the separator was determined by a frazier-type air permeability tester.

[Shrinkage by the Area (%)]

The lengths of length and breadth of a sample of 50 mm×50 mm were previously measured to calculate the area of the sample (A1). The sample was immersed in 40% KOH aqueous solution (80° C.) at a bath ratio of 1/10 (volume ratio) for 24 hours, and then the lengths of the length and breadth of the sample were measured to calculate the area of the sample (A2). The shrinkage by the area was calculated by the following formula.

Shrinkage by the Area (%)=(A1−A2)/A1×100

The sample had a shrinkage by the area of not more than 3.5% was evaluated as "A" and the shrinkage by the area of area of not less than 3.5% was evaluated as "B".

[Stiffness Strength (N)]

A sample (cross direction: 45 mm×machine direction: 50 mm) was doubly rolled lengthwise into a cylinder, and then inserted endwise into a tube made of a polypropylene, having an inside diameter of 8 mmφ and a length of 40 mm. Then, 40% KOH aqueous solution was added to the tube for wetting the top end (the height of 45 mm) of the separator cylindrically placed in the cylinder. Further, the compressive strength of 5 mm of the sample out of the tube was determined by a Handy-Type Compression Tester (KES-G5) manufactured by KATO TECH Co., Ltd., lowering a pressurized plate (2 cm$^2$) thereof at a compression speed of 1 mm/sec.

[Drop Impact Resistance Test]

After building each of the separators into a size AA battery and a size AAA battery, each 10 pieces of the batteries (20 pieces batteries in total) were dropped from the height of 1 m, with facing the positive electrode downward. Then, each of the dropped batteries was dismantled and inspected. A separator in the battery without leaking a negative electrode agent from the upper part was evaluated as "A", with leaking a negative electrode agent from the upper part was evaluated as "B".

[Evaluation of Battery Performances]

A separator was evaluated as "A" when the separator was excellent in the balance of the quantity of the absorbed electrolyte, liquid-absorption rate, the shrinkage by the area, and the air permeability. A separator was evaluated as "B" when the separator had a weakness in any kind of the performances and was lacking in the balance thereof.

[Comprehensive Evaluation]

The comprehensive evaluation of a separator was based on the evaluations both of the drop impact resistance test and battery performances. The comprehensive evaluation was determined as "A" when the separator had "A" in both evaluations. The comprehensive evaluation was determined "B" when the separator had B in either of the both evaluations.

Example 1

Thirty-five (35) parts of a polyvinyl alcohol (PVA) main fiber (manufactured by Kuraray Co., Ltd., "Vinylon: VPB033×2 (a dissolution temperature in water of not less than 100° C.)", a fineness of 0.3 dtex×an average fiber length of 2 mm), 35 parts of a mercerized LBKP (non-beating), 15 parts of an organic solvent-spun cellulose fiber (manufactured by Lenzing Inc., "Tencel", a fineness of 1.7 dtex×an average fiber length of 2 mm (before beating), CSF=100 ml), and 15 parts of a polyvinyl alcohol (PVA) binder fiber (manufactured by Kuraray Co., Ltd., "Vinylon binder:VPB105-1×3 (a dissolution temperature in water of 70° C.)", a fineness of 1.1 dtex×an average fiber length of 3 mm) were dispersed in water to prepare a slurry. Then, the slurry was subjected to a paper producing with two-layered wire parts by a short wire-cylinder paper machine and a drying by a Yankee dryer to give an alkaline battery separator having a grammage of 37.8 g/m$^2$ and a thickness of 0.131 mm. The results are shown in Table 1.

Example 2

Except for mixing 40 parts of a polyvinyl alcohol main fiber (manufactured by Kuraray Co., Ltd., "Vinylon: VPB053×2 (a dissolution temperature in water of not less than 100° C.)", a fineness of 0.6 dtex×an average fiber length of 2 mm), 35 parts of a mercerized LBKP (CSF=600 ml), 10 parts of an organic solvent-spun cellulose fiber (manufactured by Lenzing Inc., "Tencel", a fineness of 1.7 dtex×an average fiber length of 2 mm (before beating), CSF=100 ml), and 15 parts of a polyvinyl alcohol binder fiber (manufactured by Kuraray Co., Ltd., "Vinylon binder:VPB105-1×3 (a dissolution temperature in water of 70° C.)", a fineness of 1.1 dtex×an average fiber length of 3 mm), the same procedure in Example 1 was conducted, and an alkaline battery separator having a grammage of 38.1 g/m$^2$ and a thickness of 0.132 mm was obtained. The results are shown in Table 1.

Example 3

Except for mixing 30 parts of a polyvinyl alcohol main fiber (manufactured by Kuraray Co., Ltd., "Vinylon: VPB033×2 (a dissolution temperature in water of not less than 100° C.)", a fineness of 0.3 dtex×an average fiber length of 2 mm), 45 parts of a mercerized eucalyptus pulp (non-beating), 10 parts an organic solvent-spun cellulose fiber (manufactured by Lenzing Inc., "Tencel", a fineness of 1.7 dtex×an average fiber length of 2 mm (before beating), CSF=250 ml), and 15 parts of a polyvinyl alcohol binder fiber (manufactured by Kuraray Co., Ltd., "Vinylon binder: VPB105-1×3 (a dissolution temperature in water of 70° C.)", a fineness of 1.1 dtex×an average fiber length of 3 mm), the same procedure in Example 1 was conducted, and an alkaline battery separator having a grammage of 38.5 g/m² and a thickness of 0.129 mm was obtained. The results are shown in Table 1.

Example 4

Except for mixing 40 parts of a polyvinyl alcohol main fiber (manufactured by Kuraray Co., Ltd., "Vinylon: VPB033×2 (a dissolution temperature in water of not less than 100° C.)", a fineness of 0.3 dtex×an average fiber length of 2 mm), 40 parts of a mercerized LBKP (non-beating), 5 parts of an organic solvent-spun cellulose fiber (manufactured by Lenzing Inc., "Tencel", a fineness of 1.7 dtex×an average fiber length of 2 mm (before beating), CSF=50 ml), and 15 parts of a polyvinyl alcohol binder fiber (manufactured by Kuraray Co., Ltd., "Vinylon binder:VPB105-1×3 (a dissolution temperature in water of 70° C.)", a fineness of 1.1 dtex×an average fiber length of 3 mm), the same procedure in Example 1 was conducted, and an alkaline battery separator having a grammage of 37.6 g/m² and a thickness of 0.131 mm was obtained. The results are shown in Table 1.

Example 5

Except for mixing 40 parts of a polyvinyl alcohol main fiber (manufactured by Kuraray Co., Ltd., "Vinylon: VPB033×2 (a dissolution temperature in water of not less than 100° C.)", a fineness of 0.3 dtex×an average fiber length of 2 mm), 33 parts of a mercerized LBKP (non-beating), 12 parts of an organic solvent-spun cellulose fiber (manufactured by Lenzing Inc., "Tencel", a fineness of 1.7 dtex×an average fiber length of 2 mm (before beating), CSF=150 ml), and 15 parts of a polyvinyl alcohol binder fiber (manufactured by Kuraray Co., Ltd., "Vinylon binder:VPB105-1×3 (a dissolution temperature in water of 70° C.)", a fineness of 1.1 dtex×an average fiber length of 3 mm), the same procedure in Example 1 was conducted, and an alkaline battery separator having a grammage of 38.7 g/m² and a thickness of 0.131 mm was obtained. The results are shown in Table 1.

Example 6

Except for mixing 30 parts of a polyvinyl alcohol main fiber (manufactured by Kuraray Co., Ltd, "Vinylon: VPB033×2 (a dissolution temperature in water of not less than 100° C.)", a fineness of 0.3 dtex×an average fiber length of 2 mm), 10 parts of a polyvinyl alcohol main fiber (manufactured by Kuraray Co., Ltd., "Vinylon:VPB053×2 (a dissolution temperature in water of not less than 100° C.)", a fineness of 0.6 dtex×an average fiber length of 2 mm), 33 parts of a mercerized LBKP (non-beating), 12 parts of an organic solvent-spun cellulose fiber (manufactured by Lenzing Inc., "Tencel", a fineness of 1.7 dtex×an average fiber length of 2 mm (before beating), CSF=150 ml), and 15 parts of a polyvinyl alcohol binder fiber (manufactured by Kuraray Co., Ltd., "Vinylon binder:VPB105-1×3 (a dissolution temperature in water of 70° C.)", a fineness of 1.1 dtex×an average fiber length 3 mm), the same procedure in Example 1 was conducted, and an alkaline battery separator having a grammage of 38.7 g/m² and a thickness of 0.132 mm was obtained. The results are shown in Table 1.

[Table 1]

TABLE 1

| | Examples | | | | | |
|---|---|---|---|---|---|---|
| | 1 | 2 | 3 | 4 | 5 | 6 |
| Formulation of separator (parts) | | | | | | |
| PVA main fiber (0.3 dtex × 3 mm) | 35 | — | 30 | 40 | 40 | 30 |
| PVA main fiber (0.6 dtex × 3 mm) | — | 40 | — | — | — | 10 |
| PVA main fiber (1.1 dtex × 3 mm) | — | — | — | — | — | — |
| Mercerized LBKP (CSF ≧ 700 ml) | 35 | — | — | 40 | 33 | — |
| Mercerized LBKP (CSF = 600 ml) | — | 35 | — | — | — | — |
| Mercerized LBKP (CSF = 100 ml) | — | — | — | — | — | — |
| Mercerized eucalyptus pulp (CSF ≧ 700 ml) | — | — | 45 | — | — | 33 |
| Solvent-spun cellulose fiber (CSF = 550 ml) | — | — | — | — | — | — |
| Solvent-spun cellulose fiber (CSF = 350 ml) | — | — | — | — | — | — |
| Solvent-spun cellulose fiber (CSF = 300 ml) | — | — | — | — | — | — |
| Solvent-spun cellulose fiber (CSF = 250 ml) | — | — | 10 | — | — | — |
| Solvent-spun cellulose fiber (CSF = 200 ml) | — | — | — | — | — | — |
| Solvent-spun cellulose fiber (CSF = 150 ml) | — | — | — | — | 12 | 12 |
| Solvent-spun cellulose fiber (CSF = 100 ml) | 15 | 10 | — | — | — | — |
| Solvent-spun cellulose fiber (CSF = 50 ml) | — | — | — | — | — | — |
| PVA binder fiber (1.1 dtex × 3 mm) | 15 | 15 | 15 | 15 | 15 | 15 |
| Properties | | | | | | |
| Grammage (g/m²) | 37.8 | 38.1 | 38.5 | 37.6 | 38.7 | 38.1 |
| Thickness (mm) | 0.131 | 0.132 | 0.129 | 0.131 | 0.131 | 0.132 |
| Density (g/cm³) | 0.289 | 0.289 | 0.298 | 0.287 | 0.295 | 0.289 |
| Tensile strength (kN/m) | 2.68 | 2.62 | 2.94 | 2.09 | 2.23 | 2.29 |
| Quantity of the absorbed electrolyte (g/g) | 5.90 | 5.82 | 5.98 | 5.67 | 5.71 | 5.81 |
| Liquid-absorbing rate (sec/25 mm) | 112 | 111 | 125 | 129 | 125 | 105 |
| Shrinkage by the area (%) | 2.2 | 2.3 | 3.1 | 3.5 | 2.9 | 2.2 |
| Air permeability (ml/(cm² · sec)) | 8.9 | 8.8 | 8.1 | 9.5 | 8.9 | 9.4 |
| Stiffness strength (N) | 2.7 | 2.3 | 2.9 | 2.5 | 3.1 | 3.5 |

TABLE 1-continued

|  | Examples | | | | | |
| --- | --- | --- | --- | --- | --- | --- |
|  | 1 | 2 | 3 | 4 | 5 | 6 |
| Evaluations | | | | | | |
| Drop impact resistance test | A | A | A | A | A | A |
| Evaluation of the battery performances | A | A | A | A | A | A |
| Comprehensive evaluation | A | A | A | A | A | A |

Comparative Example 1

Except for mixing 35 parts of a polyvinyl alcohol main fiber (manufactured by Kuraray Co., Ltd., "Vinylon" having the fineness of 0.3 dtex×an average fiber length of 2 mm) in Example 1, 50 parts of an organic solvent-spun cellulose fiber (manufactured by Lenzing Inc., "Tencel", a fineness of 1.7 dtex×an average fiber length of 2 mm (before beating), CSF=550 ml), and 15 parts of a polyvinyl alcohol binder fiber (manufactured by Kuraray Co., Ltd., "Vinylon binder: VPB105-1×3 (a dissolution temperature in water of 70° C.)", a fineness of 1.1 dtex×an average fiber length of 3 mm), the same procedure in Example 1 was conducted, and an alkaline battery separator having a grammage of 38.1 g/m$^2$ and a thickness of 0.128 mm was obtained. The results are shown in Table 2.

Comparative Example 2

Except for mixing 20 parts of a polyvinyl alcohol main fiber (manufactured by Kuraray Co., Ltd., "Vinylon: VPB103×3 (a dissolution temperature in water of not less than 100° C.)", a fineness of 1.1 dtex×an average fiber length of 3 mm), 20 parts of a mercerized eucalyptus pulp (non-beating), 50 parts of an organic solvent-spun cellulose fiber (manufactured by Lenzing Inc., "Tencel", a fineness of 1.7 dtex×an average fiber length of 2 mm (before beating), CSF=300 ml), and 10 parts of a polyvinyl alcohol binder fiber (manufactured by Kuraray Co., Ltd., "Vinylon binder: VPB105-1×3 (a dissolution temperature in water of 70° C.)", a fineness of 1.1 dtex×an average fiber length of 3 mm), the same procedure in Example 1 was conducted, an alkaline battery separator having a grammage of 37.5 g/m$^2$ and a thickness of 0.129 mm was obtained. The results are shown in Table 2.

Comparative Example 3

Except for using a mercerized LBKP (CSF=100 ml) instead of a mercerized eucalyptus pulp (non-beating), the same procedure in Example 3 was conducted, and an alkaline battery separator having a grammage of 38.2 g/m$^2$ and a thickness of 0.13 mm was obtained. The results are shown in Table 2.

Comparative Example 4

Except for mixing 25 parts of a polyvinyl alcohol main fiber (manufactured by Kuraray Co., Ltd., "Vinylon: VPB033×2 (a dissolution temperature in water of not less than 100° C.)", 60 parts of a mercerized LBKP (CSF=600 ml), 5 parts of an organic solvent-spun cellulose fiber (manufactured by Lenzing Inc., "Tencel", a fineness of 1.7 dtex×an average fiber length of 2 mm (before beating), CSF=100 ml), and 10 parts of a polyvinyl alcohol binder fiber (manufactured by Kuraray Co., Ltd., "Vinylon binder:VPB105-1×3 (a dissolution temperature in water of 70° C.)", a fineness of 1.1 dtex×an average fiber length of 3 mm), the same procedure in Example 1 was conducted, and an alkaline battery separator having a grammage of 38.4 g/m$^2$ and a thickness of 0.130 mm was obtained. The results are shown in Table 2.

Comparative Example 5

Except for using an organic solvent-spun cellulose fiber (manufactured by Lenzing Inc., "Tencel", a fineness of 1.7 dtex×an average fiber length of 2 mm (before beating), CSF=350 ml) instead of an organic solvent-spun cellulose fiber (manufactured by Lenzing Inc., "Tencel", a fineness of 1.7 dtex×an average fiber length of 2 mm, CSF=100 ml), the same procedure in Example 1 was conducted, and an alkaline battery separator having a grammage of 37.9 g/m$^2$ and a thickness of 0.131 mm was obtained. The results are shown in Table 2.

Comparative Example 6

Except for using an organic solvent-spun cellulose fiber (manufactured by Lenzing Inc., "Tencel", a fineness of 1.7 dtex×an average fiber length of 2 mm (before beating), CSF=300 ml) instead of an organic solvent-spun cellulose fiber (manufactured by Lenzing Inc., "Tencel", a fineness of 1.7 dtex×an average fiber length of 2 mm, CSF=100 ml), the same procedure in Example 1 was conducted, and an alkaline battery separator having a grammage of 38.2 g/m$^2$ and a thickness of 0.131 mm was obtained. The results are shown in Table 2.

Comparative Example 7

Except for 35 parts of a polyvinyl alcohol main fiber (manufactured by Kuraray Co., Ltd., "Vinylon:VPB033×2 (a dissolution temperature in water of not less than 100° C.)", a fineness of 0.3 dtex×an average fiber length of 2 mm), 47 parts of a mercerized LBKP (non-beating), 3 parts of an organic solvent-spun cellulose fiber (manufactured by Lenzing Inc., "Tencel", an fineness of 1.7 dtex×an average fiber length of 2 mm (before beating), CSF=100 ml), and 15 parts of a polyvinyl alcohol binder fiber (manufactured by Kuraray Co., Ltd., "Vinylon binder:VPB105-1×3 (a dissolution temperature in water of 70° C.)", a fineness of 1.1 dtex×an average fiber length of 3 mm), the same procedure in Example 1 was conducted, and an alkaline battery separator having a grammage of 38.1 g/m$^2$ and a thickness of 0.131 mm was obtained. The results are shown in Table 2.

[Table 2]

TABLE 2

|  | Comparative Examples | | | | | | |
| --- | --- | --- | --- | --- | --- | --- | --- |
|  | 1 | 2 | 3 | 4 | 5 | 6 | 7 |
| Formulation of separator (parts) | | | | | | | |
| PVA main fiber (0.3 dtex × 3 mm) | 35 | — | 30 | 25 | 35 | 35 | 35 |
| PVA main fiber (0.5 dtex × 3 mm) | — | — | — | — | — | — | — |
| PVA main fiber (1.1 dtex × 3 mm) | — | 20 | — | — | — | — | — |
| Mercerized LBKP (CSF ≧ 700 ml) | — | — | — | — | 35 | 35 | 47 |
| Mercerized LBKP (CSF = 600 ml) | — | — | — | 60 | — | — | — |
| Mercerized LBKP (CSF = 100 ml) | — | — | 45 | — | — | — | — |
| Mercerized eucalyptus pulp (CSF ≧ 700 ml) | — | 20 | — | — | — | — | — |
| Solvent-spun cellulose fiber (CSF = 550 ml) | 50 | — | — | — | — | — | — |
| Solvent-spun cellulose fiber (CSF = 350 ml) | — | 50 | — | — | 15 | — | — |
| Solvent-spun cellulose fiber (CSF = 300 ml) | — | — | — | — | — | 15 | — |
| Solvent-spun cellulose fiber (CSF = 250 ml) | — | — | — | — | — | — | — |
| Solvent-spun cellulose fiber (CSF = 200 ml) | — | — | — | — | — | — | — |
| Solvent-spun cellulose fiber (CSF = 150 ml) | — | — | — | — | — | — | — |
| Solvent-spun cellulose fiber (CSF = 100 ml) | — | — | 10 | 5 | — | — | 3 |
| Solvent-spun cellulose fiber (CSF = 50 ml) | — | — | — | — | — | — | — |
| PVA binder fiber (1.1 dtex × 3 mm) | 15 | 10 | 15 | 10 | 15 | 15 | 15 |
| Properties | | | | | | | |
| Grammage (g/m$^2$) | 38.1 | 37.5 | 38.2 | 38.4 | 37.9 | 38.2 | 38.1 |
| Thickness (mm) | 0.128 | 0.129 | 0.130 | 0.130 | 0.131 | 0.131 | 0.131 |
| Density (g/cm$^3$) | 0.298 | 0.291 | 0.294 | 0.295 | 0.289 | 0.292 | 0.291 |
| Tensile strength (kN/m) | 2.49 | 2.40 | 2.03 | 2.41 | 2.53 | 2.51 | 2.43 |
| Quantity of the absorbed electrolyte (g/g) | 5.80 | 6.11 | 6.98 | 6.78 | 5.89 | 5.98 | 6.23 |
| Liquid-absorbing rate (sec/25 mm) | 120 | 221 | 254 | 351 | 99 | 101 | 91 |
| Shrinkage by the area (%) | 1.5 | 2.9 | 3.9 | 6.9 | 4.9 | 4.1 | 9.1 |
| Air permeability (ml/(cm$^2$·sec)) | 8.5 | 9.9 | 7.1 | 19.9 | 20.2 | 11.2 | 19.2 |
| Stiffness strength (N) | 1.7 | 1.3 | 1.2 | 2.0 | 2.7 | 2.6 | 1.4 |
| Evaluations | | | | | | | |
| Drop impact resistance test | B | B | B | A | A | A | B |
| Evaluation of the battery performances | A | A | A | B | B | B | B |
| Comprehensive evaluation | B | B | B | B | B | B | B |

As shown in Table 1, in Examples 1 to 6, the separators were produced by mixing 33 to 50% of the mercerized pulp (having a CSF value of 550 ml or the non-beating mercerized pulp), 5 to 25% of the fibrillated material (CSF=10 to 280 ml) of the organic solvent-spun cellulose fiber, 25 to 62% of the polyvinyl alcohol fiber (Vinylon) as an alkali-resistance synthetic fiber. Each of the separators had a shrinkage by the area of not more than 3.5%, a stiffness strength of not less than 2 N in a high-temperature electrolyte (after immersing in 40% KOH aqueous solution at 80° C. for 24 hours), and an air permeability that represents a denseness of not more than 10 ml/(cm$^2$·sec). The separators were excellent alkaline battery separators in both the electrolyte retention capability and the drop impact resistance.

On the contrary, as shown in Table 2, each of the separators in Comparative Examples 1 and 2 had the electrolyte retention capability, the denseness, and the dimensional stability in a high-temperature electrolyte. However, each of the separators had a stiffness strength of less than 2 N, and bent itself on impact caused by shaking or by dropping when conveying or catering the battery. As a result, the internal short circuit was caused in the battery.

The separator in Comparative Example 3 had the electrolyte retention capability and the denseness. However, the separator had a large shrinkage in area in a high-temperature electrolyte and a stiffness strength of less than 2 N, bent itself on impact caused by shaking or by dropping when conveying or catering the battery. As a result, the internal short circuit was caused in the battery.

The separators in Comparative Examples 4 to 6 had the electrolyte retention capability, the stiffness strength. However, the separators were lacking in denseness (air permeability) and had a large shrinkage in area in an electrolyte, and the separators were lacking in practicability. In addition, in the evaluation of the battery performances, the internal short circuit was caused.

The separator in Comparative Example 7 was lacking in denseness and had a large shrinkage in area in an electrolyte. In addition, the separator had a weak stiffness strength, and the internal short circuit was caused in the battery when the separator itself bent by dropping impact.

The invention claimed is:

1. An alkaline battery separator comprising a nonwoven fabric comprising an alkali-resistance synthetic fiber, a fibrillated organic solvent-spun cellulose fiber having a Canadian standard freeness value of 10 to 280 ml, and a mercerized pulp having a Canadian standard freeness value of not less than 550 ml, wherein the fibrillated organic solvent-spun cellulose fiber intertwines with the mercerized pulp, wherein the mercerized pulp comprises a mercerized product of at least one pulp selected from the group consisting of a hardwood pulp and a softwood pulp, wherein the proportion of the alkali-resistance synthetic fiber, the proportion of the fibrillated organic solvent-spun cellulose fiber, and the proportion of the mercerized pulp relative to the total amount of the separator are respectively 25 to 62% by mass, 5 to 25% by mass, and 33 to 50% by mass, and wherein the nonwoven fabric is a single-layer paper or a multi-layer paper comprising piled layers, each of the piled layers having the same compositional make-up, provided that the total amount of the separator is 100% by mass.

2. An alkaline battery separator according to claim 1, wherein the alkali-resistance synthetic fiber comprises a polyvinyl alcohol-series fiber having an average fiber fineness of not more than 1 dtex.

3. An alkaline battery separator according to claim 1, which further comprises a polyvinyl alcohol-series binder in a proportion of 3 to 20% by mass relative to the total amount of the separator.

4. An alkaline battery separator according to claim 1, which comprises a wet-laid nonwoven fabric.

5. An alkaline battery separator according to claim 1, which has a shrinkage by the area of not more than 3.5% after immersing in an aqueous solution of potassium hydroxide having a concentration of 40% by mass at 80° C. for 24 hours and a stiffness strength of not less than 2 N.

6. An alkaline primary battery comprising a separator recited in claim 1.

* * * * *